US010831855B2

(12) United States Patent
Gomez-Rosado et al.

(10) Patent No.: US 10,831,855 B2
(45) Date of Patent: Nov. 10, 2020

(54) ADAPTIVE IMAGES

(71) Applicant: salesforce.com, inc., San Francisco, CA (US)

(72) Inventors: David Gomez-Rosado, Petaluma, CA (US); Amy Lee, San Mateo, CA (US); Ayesha Mazumdar, San Francisco, CA (US); Thanh Quach, San Leandro, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 183 days.

(21) Appl. No.: 15/792,181

(22) Filed: Oct. 24, 2017

(65) Prior Publication Data

US 2019/0121917 A1    Apr. 25, 2019

(51) Int. Cl.
   *G06F 16/957*    (2019.01)
   *G06F 40/14*     (2020.01)
   *G06F 40/103*    (2020.01)

(52) U.S. Cl.
   CPC ........ *G06F 16/9577* (2019.01); *G06F 40/103* (2020.01); *G06F 40/14* (2020.01)

(58) Field of Classification Search
   None
   See application file for complete search history.

(56) References Cited

U.S. PATENT DOCUMENTS

| 6,167,441 | A  | * | 12/2000 | Himmel ................ H04L 29/06 709/217 |
| 7,308,649 | B2 | * | 12/2007 | Ehrich ................ G06F 16/958 715/235 |
| 9,654,654 | B1 | * | 5/2017  | Jing ....................... G06F 16/444 |
| 9,697,190 | B2 | * | 7/2017  | Baldwin .............. G06F 16/986 |
| 2002/0018072 | A1 | * | 2/2002 | Chui .................... H04N 1/3875 345/667 |
| 2003/0167334 | A1 | * | 9/2003 | Butler ..................... H04L 29/06 709/227 |
| 2004/0103371 | A1 | * | 5/2004 | Chen ................... G06F 16/9577 715/205 |
| 2005/0068582 | A1 | * | 3/2005 | Ferlitsch ............ H04N 1/32144 358/1.18 |
| 2006/0139371 | A1 | * | 6/2006 | Lavine ..................... G06F 3/14 345/620 |
| 2006/0193538 | A1 | * | 8/2006 | Vronay .................. G06F 16/54 382/305 |
| 2007/0229536 | A1 | * | 10/2007 | Bylsma .................... G06T 1/60 345/619 |
| 2007/0286485 | A1 | * | 12/2007 | Berkner .............. G06F 16/9577 382/176 |
| 2011/0289393 | A1 | * | 11/2011 | Choi .................... G06F 16/957 715/205 |

(Continued)

*Primary Examiner* — Howard Cortes
(74) *Attorney, Agent, or Firm* — Sterne, Kessler, Goldstein & Fox P.L.L.C.

(57) ABSTRACT

Disclosed herein are system, method, and computer program product embodiments providing an adaptive image. An embodiment operates by receiving an indication of a size of an image area of an interface allocated to an image of a webpage. An image asset corresponding to the image area is determined. One of a plurality of groupings corresponding to the size of the image is selected from the image asset. The selected grouping is provided for display on the interface in the webpage.

20 Claims, 4 Drawing Sheets

(56) References Cited

U.S. PATENT DOCUMENTS

| | | | |
|---|---|---|---|
| 2014/0189502 A1* | 7/2014 | Enns | G06T 3/4038 |
| | | | 715/247 |
| 2015/0095408 A1* | 4/2015 | Wang | H04L 67/22 |
| | | | 709/203 |
| 2015/0143228 A1* | 5/2015 | Ramani | G06F 40/14 |
| | | | 715/234 |
| 2015/0206333 A1* | 7/2015 | Crockett | G06K 9/46 |
| | | | 715/202 |
| 2015/0212654 A1* | 7/2015 | Beckett, Jr. | G06Q 30/0271 |
| | | | 705/14.67 |
| 2015/0346954 A1* | 12/2015 | Parag | G06T 3/40 |
| | | | 715/763 |
| 2015/0371366 A1* | 12/2015 | Hilt | G06T 11/60 |
| | | | 382/284 |
| 2016/0092091 A1* | 3/2016 | Hanson | G06F 40/106 |
| | | | 715/763 |
| 2016/0322029 A1* | 11/2016 | Josephirudayaraj | G09G 5/373 |
| 2017/0085932 A1* | 3/2017 | Berenger | H04L 67/2842 |
| 2017/0243356 A1* | 8/2017 | Eckert | G06T 3/40 |
| 2017/0323425 A1* | 11/2017 | Masuko | G09G 5/00 |
| 2018/0032487 A1* | 2/2018 | Stanford | G06F 17/211 |
| 2019/0065135 A1* | 2/2019 | Yamat | G06F 3/1454 |

\* cited by examiner

ADAPTIVE IMAGES

BACKGROUND

Images are often displayed on a webpage regardless of where (on which device) the webpage is being displayed. For example, whether the webpage is being viewed on a mobile phone or smart television, the webpage will include the same images that may be scaled to fit the screens of the respective devices. However, not all images are suitable to be scaled, resized, stretched, or shrunk to different screen sizes, and doing so may reduce the quality of the images.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing adaptive images.

Figure 1:
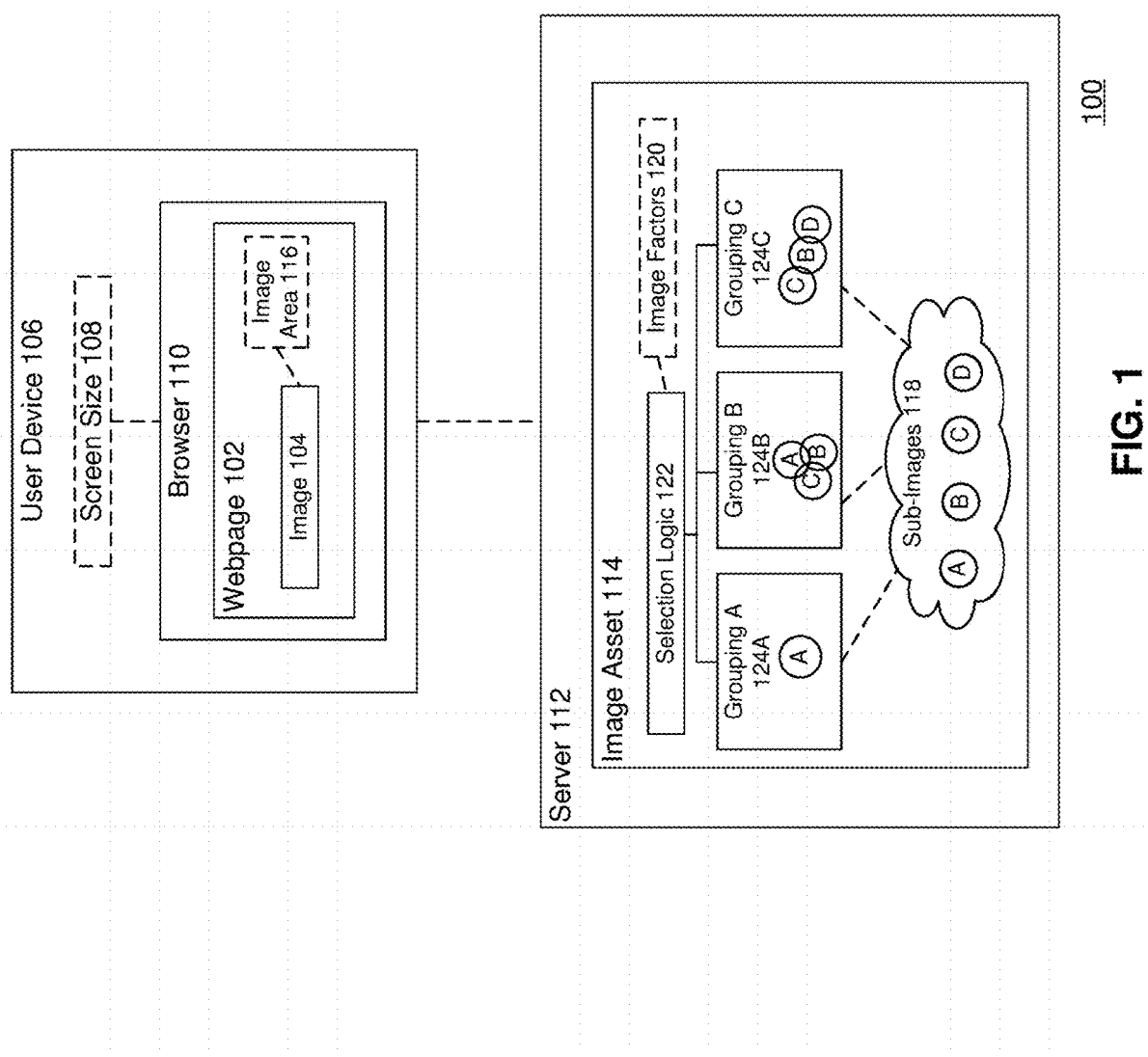
FIG. 1 is a block diagram showing example operations for providing an adaptive image, according to some embodiments.

FIG. 1 is a block diagram 100 showing example operations for providing an adaptive image, according to some embodiments. A browser 110 may request a webpage 102 from a server 112 for display on a user device 106 with a particular screen size 108. Webpage 102 may include an image 104 and other content that for display at the requesting device 106.

In a conventional environment, a device may receive the content of a webpage and scale the content to fit it on the screen of the device. The scaling may include increasing or decreasing the size of the images and text. However scaling the images often reduces the quality of the images because some images, based on their resolution, file format, or other factors, may be not be suitable for scaling. The result is that portions of the image may become blurred, stretched, illegible, or otherwise no longer suitable for display in the given screen size.

Rather simply scaling a single static image to fit different screen sizes, image 104 may be an adaptive image that can be changed or varied based on the display environment taking into account different variables including, but not limited to, screen size 108. As such, a device 106 with a large screen (such as a television) may render one image 104 when requesting webpage 102 (for example, an image with lots of details that can be seen on the large screen), while a device 106 with a smaller screen (such as a mobile phone) may render a different image 104 when requesting the same webpage 102 (for example, a simpler image some of the details abstracted that is more suitable for viewing on a smaller screen). The respective images may still be scaled by the user device 106, as necessary, for display on the screen or browser 110 window.

Rather than using an image source tag to reference a single/static image to be displayed on a webpage, the reference to image 104 in the code of webpage 102 may indicate an image asset 114. Image asset 114 may be an image variable, in which different images are displayed or rendered depending on the screen size 108 and other display variables of a device 106 where webpage 102 is to be rendered.

Image asset 114 may include a definition of one or more groupings 124. Grouping 124 may include one or more sub-images 118 which are arranged as images 104 for display in webpage 102. Sub-images 118 may be self-contained image files that can be visibly displayed on a screen. Groupings 124A-C may include one or more selected sub-images 118 that are arranged together in various ways for display in various user devices 106 with various display variable values. In an embodiment, a single sub-image 118 may be used across multiple different groupings 124.

For example, a user operating user device 106 may request webpage 102 within browser 110. Browser 110 may receive, determine, or otherwise query different variables about the media or display environment of user device 106. Based on the display variables, either server 112 or browser 110, may determine which image (i.e., grouping 124) of image asset 114 is to be displayed.

In an embodiment, image asset 114 may describe how an image is to be built or arranged for display on the requesting device 106 using one or more sub-images 118. For example, rather than simply providing a number of pre-configured images that can be displayed, image asset 114 may include different groupings 124A-C of sub-images 118. For example, sub-images 118 may be various shapes, and groupings 124 may be different collections or arrangements of one or more of those shapes. Each grouping 124 may indicate how an image 104 that is to be displayed is to be built or rendered. The groupings 124 may vary depending on the requesting device 106 and other display, media, or environmental variables.

Selection logic 122 may be used for determining which grouping 124 is to be displayed on the requesting device 106 based on the request. In one embodiment, server 112 may receive the request for webpage 102 and determine which grouping 124 (e.g., including corresponding sub-images 118) to transmit or to user device 106 for display in webpage 102 based on selection logic 122. In another embodiment, server 112 may transmit image asset 114 to browser 110, and browser 110 (based on selection logic 122) may determine which grouping 124A-C to display. Then, for example, browser 110 may request the corresponding grouping 124 or sub-image(s) 118 from server 112.

Example display or environmental variables may include a type of user device 106 or browser 110 (including window size), screen size 108, and image area 116. The user device variable may indicate a device type, viewport, form factor, manufacturer, model, firmware, and/or software of user device 106. For example, the user device variable may indicate whether the user device 106 is a mobile phone or laptop computer, what operating system is operating on the device, and what model of device it is. The screen variable may indicate the screen size 108 of the device, a manufacturer of the screen, a graphics card, a resolution, and whether the screen is touchscreen.

An image area variable may indicate a size of an image area 116 allocated to the image 104 within webpage 102. Image area 116 may indicate dimensions of a box or area into which image 104 is to fit (which may account for the screen and/or window size), a size indicator (small, medium, large), and/or a location of image 104 within webpage (e.g., within the masthead, sidebar, bottom, left, right, etc.). A browser variable may indicate the type of browser 110 or software app or application in which the requested webpage 102 is to be displayed or that is requesting the webpage 102.

Webpage 102 may be any document, app, container, or file that may display images in a web browser or other application. In embodiments, webpage 102 may include a webpage, e-mail, or image file that is requested to be displayed. Webpage 102 may include HTML (hyper-text markup language), JavaScript®, or other code.

Server 112 may receive the values of various display variables and may determine which sub-images 118, corresponding to which grouping(s) 124, to transmit to browser 110 for rendering on the screen of user device 106 based on selection logic 122. In an embodiment, selection logic 122 may include pre-configured code that indicates which grouping 124 is to be displayed as image 104 and how the image is to be built (from sub-images 118) for different value combinations of the display variables. As discussed in greater detail below, groupings 124 or selection logic 122 may include one or more image factors 120 or visual/image manipulations to be applied to the groupings 124. An example set of groupings 124 arranged from sub-images 118 and applied image factors 120 according to selection logic 122 is shown in FIG. 2.

Figure 2:
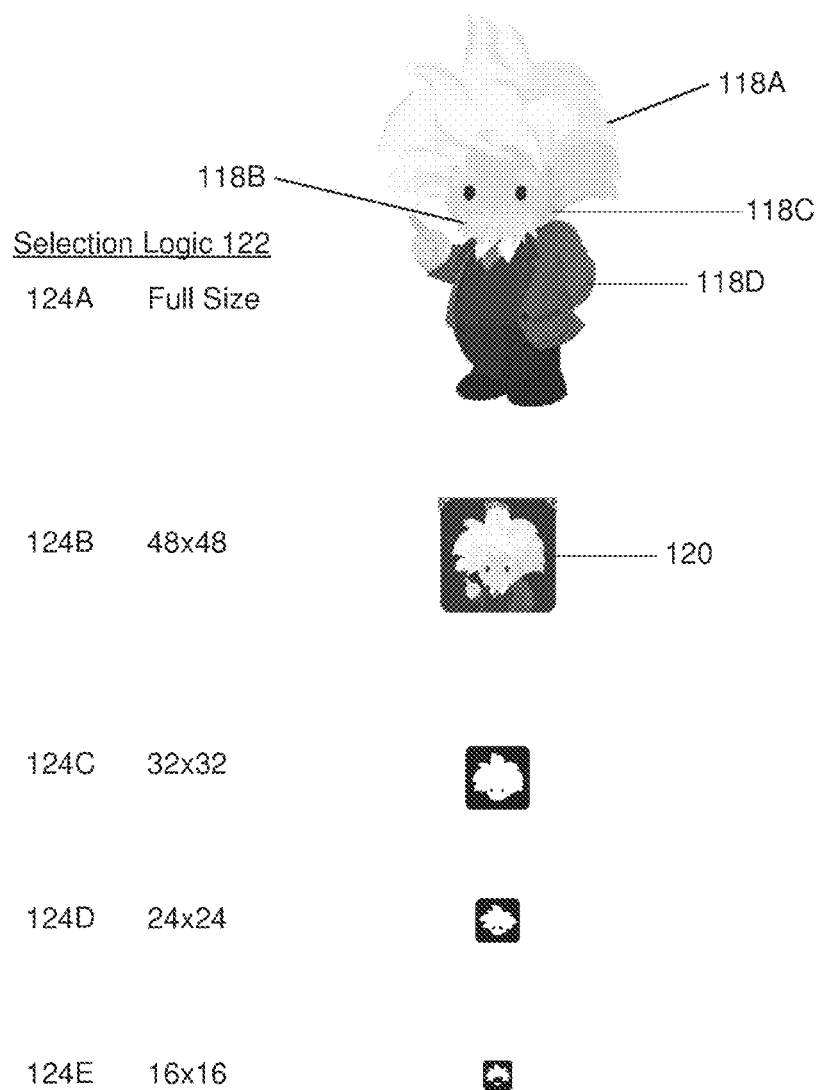
FIG. 2 is illustrates an example adaptive image, according to an embodiment.

FIG. 2 is illustrates an example adaptive image 204, according to an embodiment. The example of FIG. 2, illustrates five different groupings 124A-E that correspond to different screen/window sizes 108 or image areas 116 (as indicated by selection logic 122). Each grouping 124 corresponds to an image that is built from one or more sub-images 118.

In an embodiment, an image may include a compilation or assembly of multiple sub-images 118. Building groupings 124 from sub-images may enable a system (e.g., such as server 112) to save storage space through re-use. For example, the full size image of Albert Einstein may include an arrangement of four sub-images 118A-D. The sub-images 118 may include the hair 118A, mustache 118B, head 118C, and body 118D. As may be seen, selections of these sub-images 118 may be used across multiple groupings 124, thus requiring less storage space, fewer calls to the server, and less network bandwidth in transmitting the sub-images from server 112 to user device 106. For example, all five images (groupings 124) or adaptive image 204 may be rendered from only four sub-images 118.

Grouping 124A may include the particular arrangement of sub-images 118A-D as shown. Grouping 124A may be optimized for large screen sizes (e.g., larger than 48×48), showing the full body 118D sub-image. Then, for example, if a requesting device 106 has a large or full size screen, grouping 124A featuring the full Albert Einstein with full body would be provided by server 112 for display.

If, however, the display variables indicate a smaller screen size 108 (e.g., 32×32), then grouping 124C may be provided. As may be seen, grouping 124C may include scaled down versions of sub-images 118A, 118B, and 118C, but may not include 118D (the body). In an embodiment, selection logic 122 may indicate that sub-image 118D is to be 'turned off' for grouping 124C.

Turning off a sub-image 118 may indicate that the particular sub-image 118 is not shown or displayed. In an embodiment, the sub-images 118 may include on/off flags which may be set. Then, for example, a single arrangement such as grouping 124A may be assembled, and the various sub-images may be turned on/off, scaled, or otherwise manipulated for any other desired variations or groupings 124 (without having to recreate the original grouping 124A).

In an embodiment, it may be that scaling down the entire grouping 124A (including sub-image 118D) to fit into a 32×32 screen would make the overall image unidentifiable (e.g., a user may no longer be able to see the likeness to Albert Einstein). As such, rather than simply allowing a device to scale down the full size image (124A), a device 106 with a 32×32 screen would receive the grouping 124C without the body sub-image 118D (i.e., with the sub-image 118D being turned off).

Not only does re-use save storage space, but also updating images becomes simpler through use of an adaptive image 204. For example, if in commemoration of Halloween a developer wanted to color the mustache orange, rather than having to manipulate five different individual images, the mustache sub-image 118B could be colored orange once and the change would automatically propagate to any grouping 124 using or referencing the mustache sub-image 118B. In another embodiment, the opaqueness, brightness, hue, color, contrast, transparency, and other image manipulations may be applied to each sub-image 118 independently of other sub-images 118, thus allowing greater re-use and flexibility as to the number of different groupings 124 that can be rendered from a single set of sub-images 118.

While the example of FIG. 2 illustrates re-use of the same sub-images 118 across the various groupings 124, in another embodiment, a grouping 124 may include a sub-image 118 that is only used in that particular grouping 124. For example, grouping 124D may include a sub-image 118 of a glass beaker (not shown) rather than the scaled-down Einstein head (made up of sub-images 118A, B, and C).

In an embodiment, image factors 120 may be applied to any arrangement of sub-images 118 or groupings 124. Image factors 120 include any visual manipulation or adjustment that may be applied to an image (grouping 124) regardless of the contents of the image. Example image factors 120 include masking, scaling, line thickness, transparency, positioning, cropping a portion of the image, tinting, and changing the brightness, hue, background color, or any other visual manipulation.

In the example of FIG. 2, three image factors 120 may be applied to grouping 124A to produce grouping 124B. The first image factor may be a scaling down of the grouping 124A. The second image factor may be cropping of the lower half of the body sub-image 118D. The third image factor may be applying a background color to the image. In an embodiment, a masking image factor may include applying a cut out in a shape, such as a star, so that only that portion of the grouping 124 that fits within the star shape is visible.

Returning to FIG. 1, in an embodiment, image asset 114 may include a scalar vector graphic (SVG) file. In a conventional environment, a webpage may include an image reference to an SVG file that includes different configured full-scale images. Then it is up the developer to determine which image to use when. This process can become burdensome for the developer and introduces the likelihood of developer errors and inconsistencies across webpages featuring similar images.

By contrast, the SVG file of image asset 114 may be a text file that includes root addresses that point to the various sub-images 118, rather than fully assembled or configured images. In an embodiment, SVG images and their behaviors may be defined in XML text files, and can be rendered by browser 110. CSS (cascading style sheets) is a style sheet language used for describing the presentation of a document written in a markup language. CSS can be applied to HTML, XML, and SVG. CSS enables separation of presentation and content, including aspects such as the layout, colors, and fonts.

In an embodiment, image asset 114 may include nested CSS information or code that indicates how groupings 124 are to be assembled from the sub-images 118 (as referenced in the SVG file). Image asset 114 may also indicate which image factors 120 (if any) to apply, and when each grouping 124 is to be displayed (e.g., based on which environmental variables). In an embodiment, this information may be included in selection logic 122.

In an embodiment, one of the groupings 124A-E may be selected as a default image, as a failsafe. Then for example, if a CSS class name referring to a particular grouping or root path is missing or misspelled, the default image may be used.

Image asset 114 may make the coding of webpage 102 simpler for a developer. For example, rather than having to manually code and reference multiple image files and determine how and when each one will and will not be used, the developer may include a single reference to image asset 114 in webpage 102. Then, for example, based on selection logic 122, the proper grouping 124 may be selected and displayed by browser 110 or otherwise delivered for display by server 112.

Not only could this arrangement be beneficial for a single webpage, but also image asset 114 may enable uniformity across different webpages and may save a developer from having to individually code various display options for the same images being used across different webpages (and save the system resources from having to store and process the developer's coding). For example, if the Einstein image 204 was used on multiple webpages 102, the same image asset 114 could be referenced rather than having to have duplicative code that would need to stored and processed for each contingency.

Figure 3:
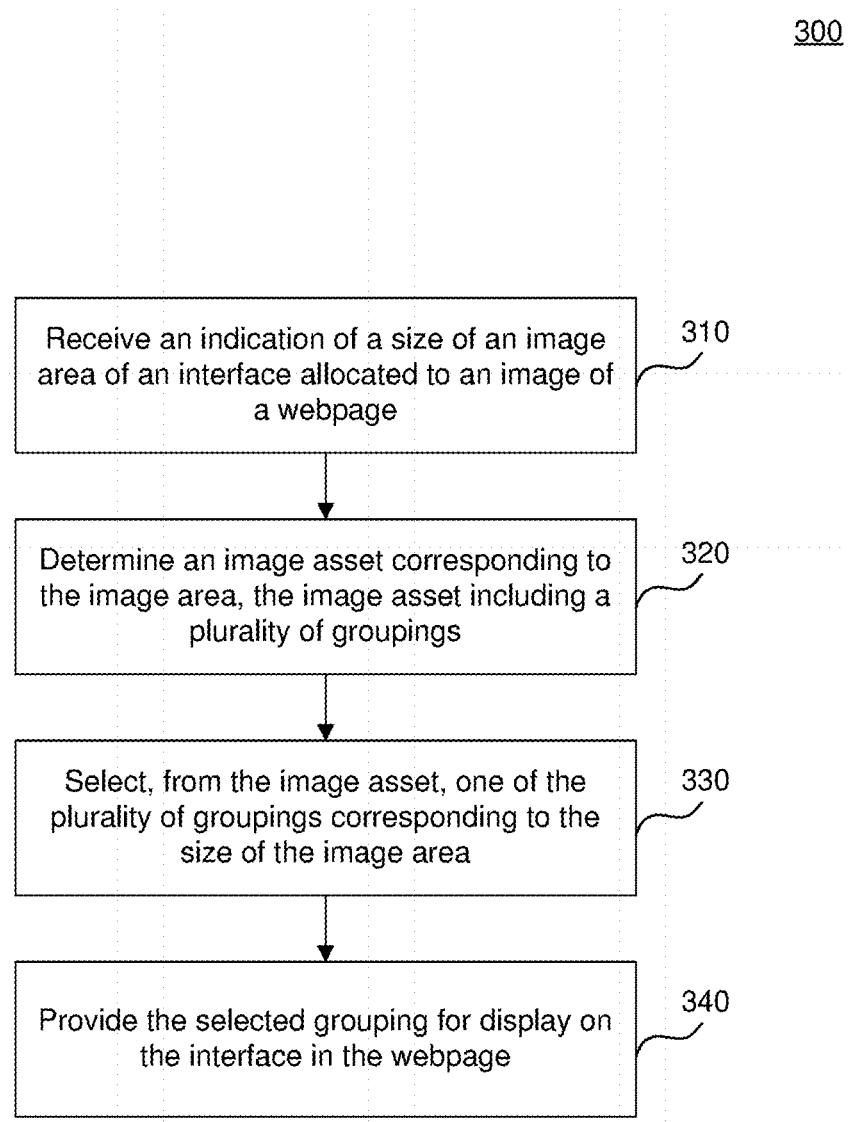
FIG. 3 is a flowchart illustrating a process for providing an adaptive image, according to some embodiments.

FIG. 3 is a flowchart illustrating a process 300 for providing an adaptive image, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 310, an indication of a size of an image area is received. For example, browser 110 may determine where an image 104 is to be displayed within a webpage 102 and how much space or what dimensions are allocated to the displaying of the image 104 (e.g., image area 116). In an embodiment, image area 116 may account for the screen size 108 and/or window size where the image 104 is to be displayed.

At 320, an image asset corresponding to the image area is determined. For example, browser 110 may transmit a request for webpage 102. The request may include an indication of which webpage 102 is being requested and one or more environmental variables or grouping names. Server 112 may transmit webpage 102 to browser 110.

In an embodiment, the request may include one or more display variables (e.g., such as image area 116, screen size 106, browser-type, etc.). Then, for example, server 112 may process image asset 114 locally and provide the corresponding grouping 124 or sub-images to user device 106 over a telecommunications network. This may save network bandwidth that would otherwise be necessary in unnecessarily transmitting image files that are not used or rendered.

In another embodiment, server 112 may transmit image asset 114 to user device 106, and selection logic 122 may be processed by browser 110. This may enable, browser to display different groupings 124A-C based on changing display variables. For example, a user may increase or decrease the size of a browser window, which may cause browser 110 to display different groupings 124 in webpage 102 (without having to make subsequent requests to server 112. In this embodiment, window size may an environment variable accounted for by image area 116.

At 330, one of the plurality of groupings corresponding to the size of the image area is selected. For example, as shown in FIG. 2, a single adaptive image 204 may include different groupings based on different display variables. The example shown is limited to the screen or window size, however other embodiments may include groupings based on device type, browser type, etc. The corresponding grouping 124 is selected for display.

At 340, the selected grouping is provided for display. For example, browser 110 may display the selected grouping 124. In an embodiment, as referenced above, browser 110 may dynamically select different groupings based on changing display variables, such as a user adjusting the size of the browser window where webpage 102 is being displayed.

Figure 4:
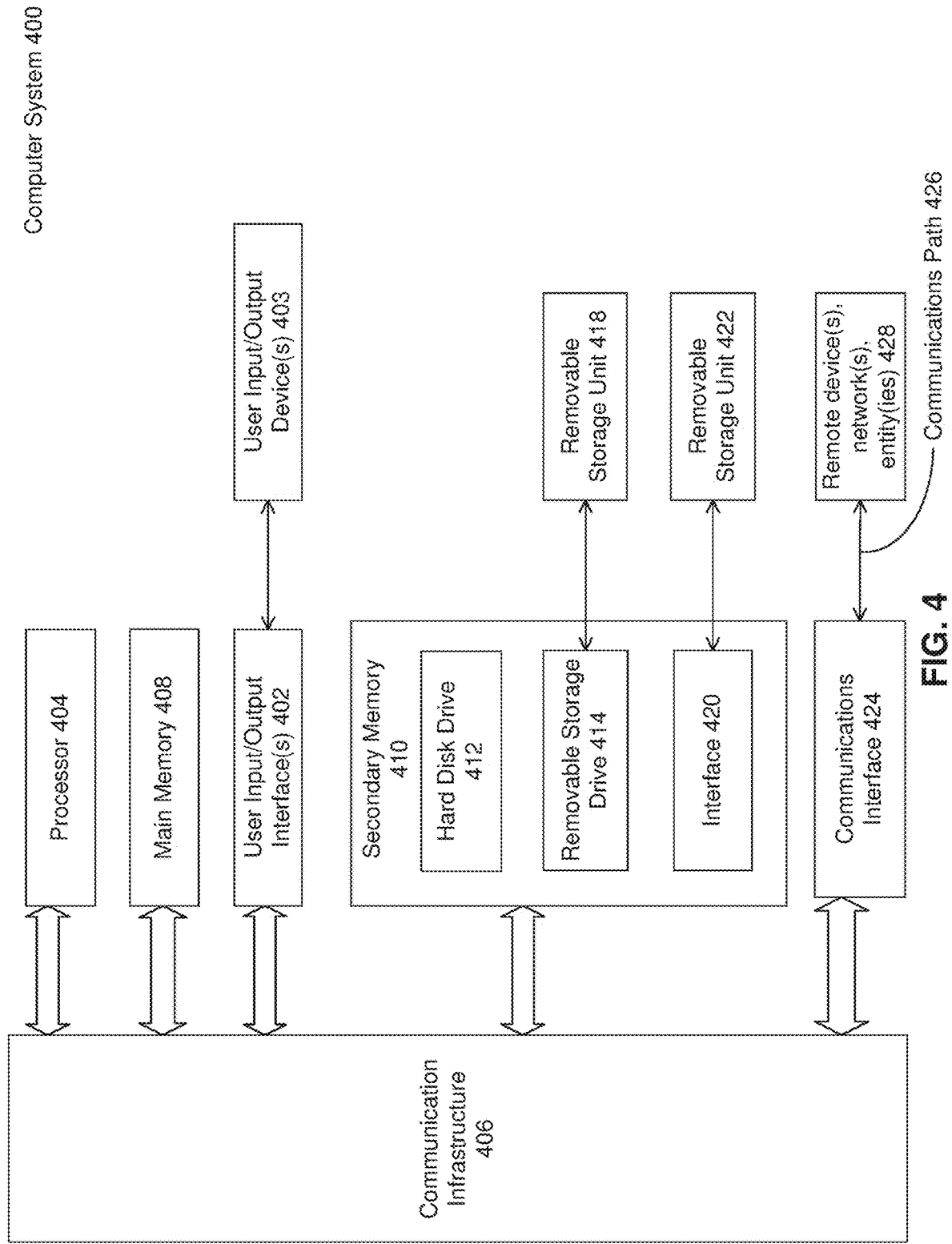
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (BON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
receiving a request for an image of a webpage, the request including an indication of a size of an image area of an interface allocated to the image of the webpage;
selecting one of a plurality of image variations based on the size of the image area within the webpage, wherein each of the plurality of image variations correspond to the image at varying different sizes, and wherein each image variation of the plurality of image variations is arranged using a combination of one or more of a set of sub-images arranged to construct the image for display within the webpage;
arranging, responsive to the request, the selected image variation corresponding to the size of the image area from the set of sub-images, wherein the selected image variation includes a first sub-image arranged to at least partially obscure a portion of a second sub- image; and
providing the arranged image variation, including the first sub-image arranged to obscure at least the portion of the second sub-image, for display within the image area on the interface in the webpage.

2. The method of claim 1, wherein the selected grouping corresponds to a selected one or more sub-images of the image asset arranged in a manner to fit within the image area, wherein at least one other sub-image of the image asset is not part of the selected one or more sub-images corresponding to the selected grouping.

3. The method of claim 2, wherein the image asset corresponds to a scalable vector graphic (SVG) file including a plurality of root paths, each root path corresponding to one of the sub-images.

4. The method of claim 3, wherein the image asset comprises cascading style sheet (CSS) code that determines which one or more sub-images to select for the selected grouping and how to arrange the selected one or more sub-images for the image area.

5. The method of claim 1, further comprising:
determining a change in the size of the image area; and
selecting, from the image asset, a second one of the plurality of groupings corresponding to the changed size of the image area, wherein the second grouping replaces the first grouping within the interface.

6. The method of claim 5, wherein the selecting the second one of the plurality of groupings comprises:
determining an image factor to apply to the first grouping, wherein the image factor changes one or more visual aspects of the first grouping; and
applying the image factor to the first grouping to produce the second grouping for display.

7. The method of claim 6, wherein the applying the image factor comprises cropping a portion of the first grouping.

8. The method of claim 6, wherein the applying the image factor comprises turning off one of a plurality of sub-images of first grouping, wherein the turned off sub-image of the first grouping is not visible in the second grouping.

9. The method of claim 1, wherein an unselected one of the plurality of image variations includes a third sub-image in addition to the first sub-image and the second sub-image.

10. A system, comprising:
a memory; and
at least one processor coupled to the memory and configured to:
receiving a request for an image of a webpage, the request including an indication of a size of an image area of an interface allocated to the image of the webpage;
selecting one of a plurality of image variations based on the size of the image area within the webpage, wherein each of the plurality of image variations correspond to the image at varying different sizes, and wherein each image variation of the plurality of image variations is arranged using a combination of one or more of a set of sub-images arranged to construct the image for display within the webpage;
arranging, responsive to the request, the selected image variation corresponding to the size of the image area from the set of sub-images, wherein the selected image variation includes a first sub-image arranged to at least partially obscure a portion of a second sub- image; and
providing the arranged image variation, including the first sub-image arranged to obscure at least the portion of the second sub-image, for display within the image area on the interface in the webpage.

11. The system of claim 10, wherein the selected grouping corresponds to a selected one or more sub-images of the image asset arranged in a manner to fit within the image area, wherein at least one other sub-image of the image asset is not part of the selected one or more sub-images corresponding to the selected grouping.

12. The system of claim 11, wherein the image asset corresponds to a scalable vector graphic (SVG) file including a plurality of root paths, each root path corresponding to one of the sub-images.

13. The system of claim 12, wherein the image asset comprises cascading style sheet (CSS) code that determines which one or more sub-images to select for the selected grouping and how to arrange the selected one or more sub-images for the image area.

14. The system of claim 10, wherein the processor is further configured to:
determine a change in the size of the image area; and
select, from the image asset, a second one of the plurality of groupings corresponding to the changed size of the image area, wherein the second grouping replaces the first grouping within the interface.

15. The system of claim 14, wherein the processor that selects the second one of the plurality of groupings is configured to:
determine an image factor to apply to the first grouping, wherein the image factor changes one or more visual aspects of the first grouping; and
apply the image factor to the first grouping to produce the second grouping for display.

16. The system of claim 15, wherein the applying the image factor comprises cropping a portion of the first grouping.

17. The system of claim 16, wherein the applying the image factor comprises turning off one of a plurality of sub-images of first grouping, wherein the turned off sub-image of the first grouping is not visible in the second grouping.

18. A non-transitory computer-readable device having instructions stored on a memory thereon that when executed by at least one processor of the device, causes the at least one processor to perform operations comprising:
- receiving a request for an image of a webpage, the request including an indication of a size of an image area of an interface allocated to the image of the webpage;
- selecting one of a plurality of image variations based on the size of the image area within the webpage, wherein each of the plurality of image variations correspond to the image at varying different sizes, and wherein each image variation of the plurality of image variations is arranged using a combination of one or more of a set of sub-images arranged to construct the image for display within the webpage;
- arranging, responsive to the request, the selected image variation corresponding to the size of the image area from the set of sub-images, wherein the selected image variation includes a first sub-image arranged to at least partially obscure a portion of a second sub-image; and
- providing the arranged image variation, including the first sub-image arranged to obscure at least the portion of the second sub-image, for display within the image area on the interface in the webpage.

19. The device of claim 18, wherein the selected grouping corresponds to a selected one or more sub-images of the image asset arranged in a manner to fit within the image area, wherein at least one other sub-image of the image asset is not part of the selected one or more sub-images corresponding to the selected grouping.

20. The device of claim 19, wherein the image asset corresponds to a scalable vector graphic (SVG) file including a plurality of root paths, each root path corresponding to one of the sub-images.

\* \* \* \* \*